(12) United States Patent
Krammer et al.

(10) Patent No.: US 7,715,427 B2
(45) Date of Patent: May 11, 2010

(54) METHOD FOR DATA COMMUNICATION

(75) Inventors: Josef Krammer, Holzkirchen (DE);
Bettina Holzmann, Munich (DE);
Anton Schedl, Munich (DE); Grzegorz Olender, Munich (DE); Lucien Stemmelen, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 747 days.

(21) Appl. No.: 11/517,374

(22) Filed: Sep. 8, 2006

(65) Prior Publication Data

US 2007/0039006 A1 Feb. 15, 2007

Related U.S. Application Data

(63) Continuation of application No. PCT/EP2005/000977, filed on Feb. 1, 2005.

(30) Foreign Application Priority Data

Mar. 11, 2004 (DE) ............ 10 2004 011 946

(51) Int. Cl.
*H04J 3/02* (2006.01)
(52) U.S. Cl. ............. 370/462; 370/442; 370/458; 710/117
(58) Field of Classification Search .......... 370/458, 370/444, 244, 468, 462; 710/117; 718/107
See application file for complete search history.

(56) References Cited

U.S. PATENT DOCUMENTS 5,043,982 A * 8/1991 Werner ............ 370/507

5,737,335 A * 4/1998 Mizuta et al. ............ 370/444
6,138,200 A * 10/2000 Ogilvie ............ 710/244
6,504,853 B1 * 1/2003 Lindgren et al. ............ 370/468

(Continued)

FOREIGN PATENT DOCUMENTS

DE 195 41 637 A1 5/1996

(Continued)

OTHER PUBLICATIONS

Rostamzadeh, B., et al., Dacapo: A Distributed Computer Architecture for Safety-Critical Control Applications, Intelligent Vehicles '95 Symposium, Proceedings of the Detroit, MI, Sep. 25-26, 1995, New York, NY, IEEE, Sep. 25, 1995, pp. 376-381.

(Continued)

*Primary Examiner*—Ricky Ngo
*Assistant Examiner*—Rasheed Gidado
(74) *Attorney, Agent, or Firm*—Crowell & Moring LLP

(57) ABSTRACT

In a method for carrying out cyclic and conflict-free data communication for the subscribers of a data bus, which transmits data in non-overlapping time periods within a subscriber cycle interval and processes jobs, and whose fixed transmission time slots in a planning phase are allocated within the subscriber cycle interval, the task processing for a subscriber is carried out exclusively within an application time interval within the subscriber cycle interval, and in the planning phase the transmission time slots for each subscriber, within a transmission time interval which is disjunct with respect to the application time interval, are selected within the subscriber cycle interval, and the selected transmission time slots are communicated to the subscribers in a subsequent initializing phase.

19 Claims, 9 Drawing Sheets

U.S. PATENT DOCUMENTS

| | | | |
|---|---|---|---|
| 6,947,389 B1 * | 9/2005 | Chen et al. .................. | 370/252 |
| 2005/0131852 A1 | 6/2005 | Berwanger et al. | |
| 2005/0232224 A1 | 10/2005 | Belschner et al. | |

FOREIGN PATENT DOCUMENTS

| | | |
|---|---|---|
| DE | 102 00 201 A1 | 7/2003 |
| DE | 102 16 984 A1 | 11/2003 |
| EP | 0 692 168 B1 | 5/1999 |
| EP | 1 199 848 A2 | 4/2002 |
| WO | WO 03/056764 A1 | 7/2003 |

OTHER PUBLICATIONS

Hansson, H., et al., Basement: An Architecture and Methodology for Distributed Automotive Real-Time Systems, IEEE Transactions on Computers, IEEE, Inc., New York, US, Sep. 1997, pp. 1016-1027, vol. 46, No. 9.

International Search Report dated May 31, 2005, including PCT/ISA/237 (Written Opinion of the International Searching Authority) with English translation of relevant portion (thirteen (13) pages).

German Search Report dated Jan. 12, 2005 with English translation (eight (8) pages).

* cited by examiner

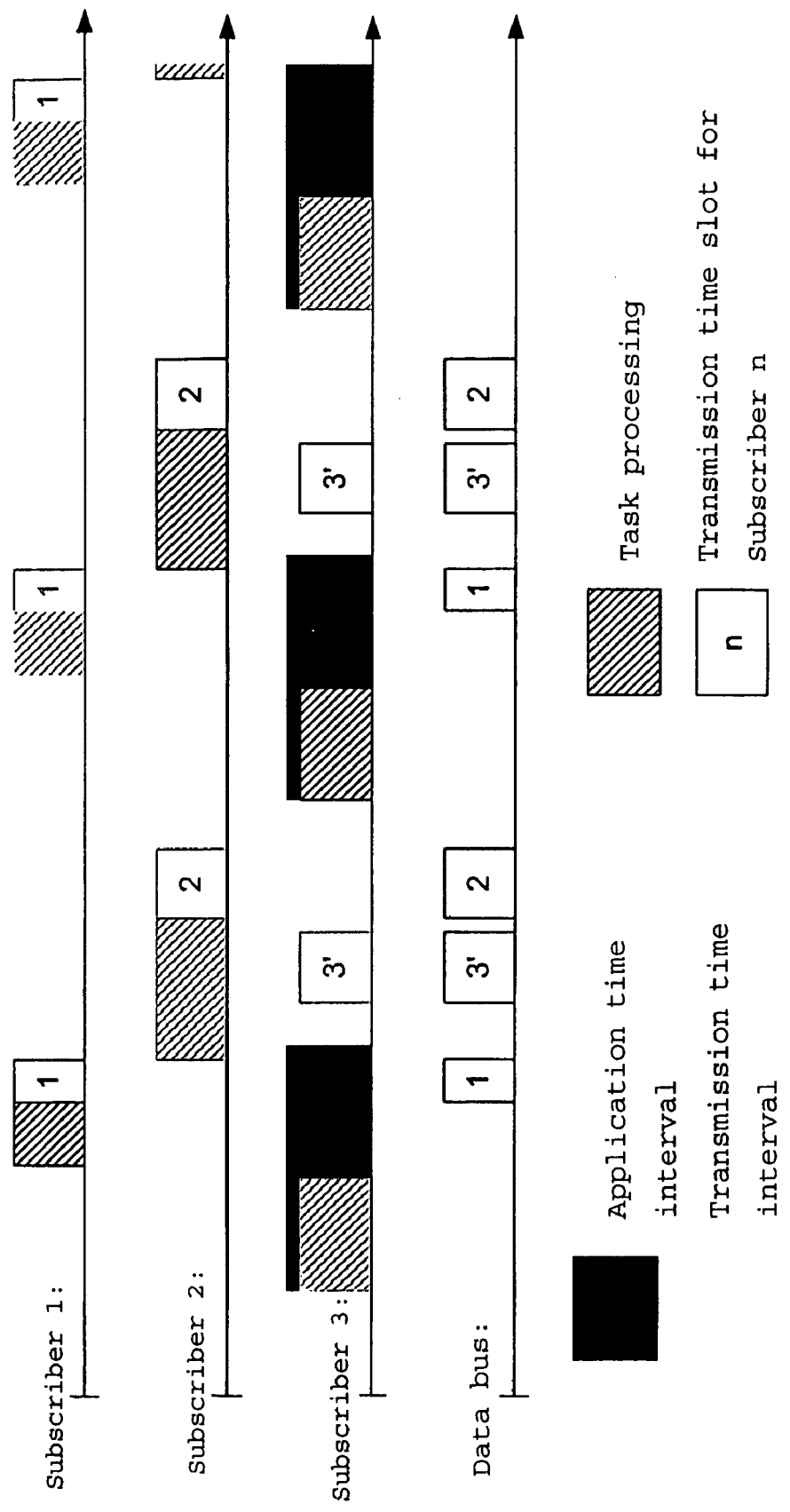

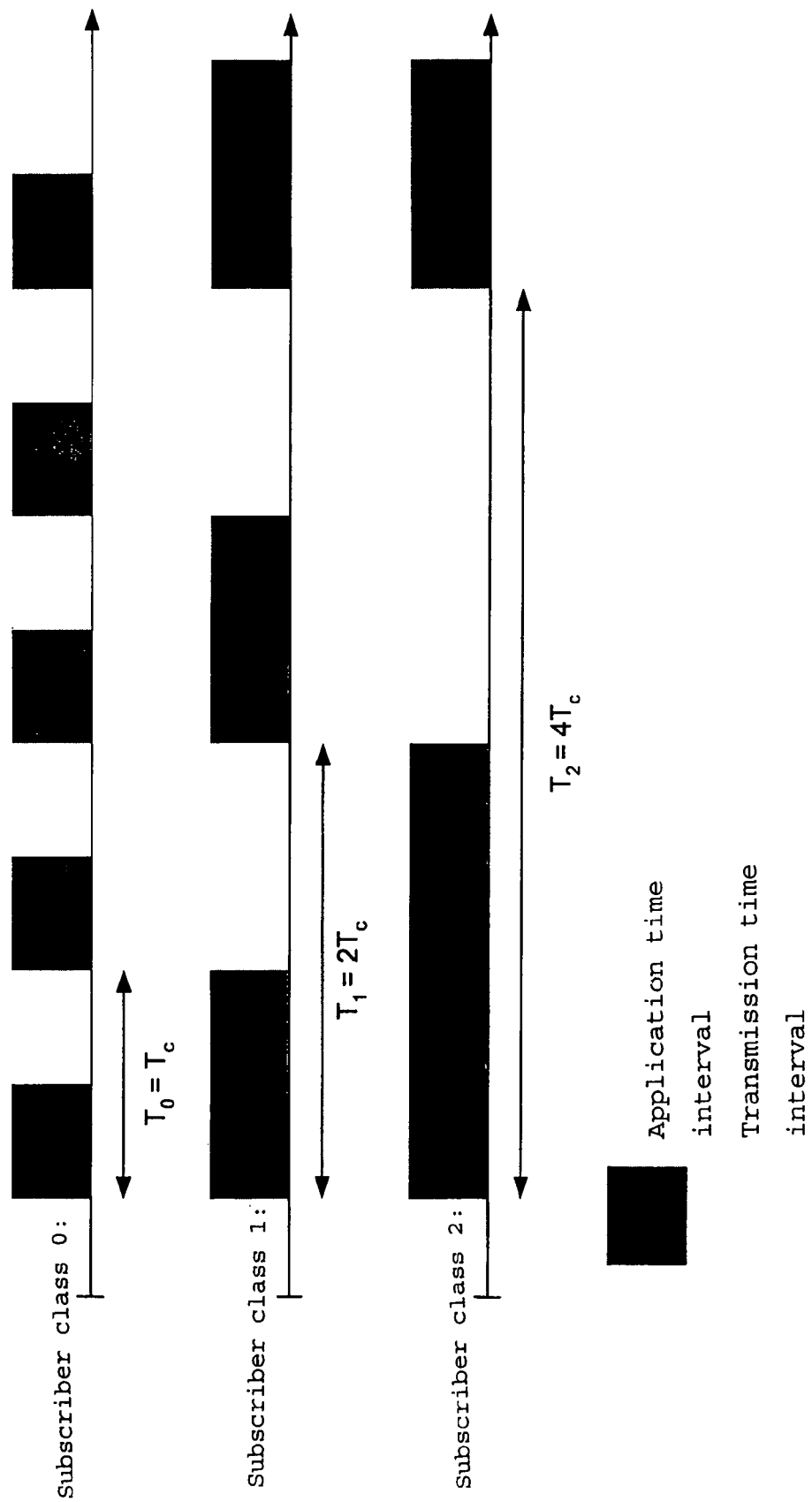

METHOD FOR DATA COMMUNICATION

CROSS REFERENCE TO RELATED APPLICATIONS

This application is a continuation of PCT International Application No. PCT/EP2005/000977, filed on Feb. 1, 2005, which claims priority under 35 U.S.C. §119 to German Patent Application No. 10 2004 011 946.5 filed Mar. 11, 2004, the entire disclosures of which are herein expressly incorporated by reference.

BACKGROUND AND SUMMARY OF THE INVENTION

The present invention relates to a method for carrying out cyclic and conflict-free data communication for the subscribers of a data bus, which transmits data in non-overlapping time periods within a subscriber cycle interval and processes jobs, and whose fixed transmission time slots in a planning phase are allocated within the subscriber cycle interval.

Time-driven data buses are finding increased application in motor vehicles and other means of transport (aircraft, trains, and ships, for example). In contrast to event-driven data buses, they are preferably used in cases where security-relevant data are to be exchanged between control devices at regular intervals with high reliability and low fluctuation over time (jitter). A major advantage of time-driven data buses with regard to ensuring such characteristics is that a continuous occupation of the data bus, resulting from malfunction of a control device, for example, is prevented.

DE 102 00 201 A1 discloses a method for communication to various subscribers via a time-driven data bus. In the method, the subscribers send messages cyclically in fixed transmission time slots via the data bus. The time period for transmitting a message, referred to below as "subscriber cycle time," may be identical to the bus cycle time, i.e., the length of a bus cycle interval. However, a transmission time slot may also be used in different bus cycle intervals by different subscribers, thereby increasing the subscriber cycle time compared to the bus cycle time. According to the prior art, the subscriber cycle time may also be reduced when multiple transmission time slots within a bus cycle interval are occupied by the same message.

According to the prior art, for a time interval in which all messages transmitted via the data bus are repeated, a scheduling process specifies a system-wide sequence (schedule) in which the functional dependencies of all subscribers are taken into account, and all subscribers communicate in each strictly specified transmission time slot via the data bus in a conflict-free manner. In this scheduling process the application time periods are also specified in coordination with the transmission time slots. The configuration of the control devices for the particular application time periods may be absolute with respect to time, or may be relative, based on the transmission time slots.

Such a specification often creates a close interlinking between transmission time slots and application time periods for multiple subscribers. This interlinking results in a strong temporal dependency between the applications for various subscribers. Functional modifications or replacement of a control device may require that the schedule be changed. As a result of the temporal dependency, such schedule changes often apply not just to individual subscribers, but to multiple subscribers that are linked to one another by a causal chain. Thus, a single functional modification may affect multiple subscribers and control devices.

In the development divisions of many industrial sectors such as the automotive industry, where any change to safety-relevant applications is subject to strict controls, every modification to a device entails an extensive certification process. The time required to complete each certification process represents a waiting period within the development process, and generally results in prolonged development time and increased development costs for a device and for components which depend on this device.

As described above, when the communication and the application are closely coupled together in a bus system, as in the prior art, the modification of a control device frequently makes it necessary to change other control devices having certification requirements. In addition, the usability of a certified control device is generally limited by the methods according to the prior art to a single bus system. If a control device is to be used in various bus systems and functionally integrated therein, as a rule the same transmission time slots cannot be assigned to the control device in all bus systems. According to the prior art, this results in generally different application time periods for the subscribers which are in different bus systems and associated with this control device. Each of the different variants which results must go through its own certification process.

Exemplary embodiments of the invention provide a method by which the number of required certification measures is reduced in conjunction with the replacement and modification of individual control devices of a time-driven data bus.

This is achieved by exemplary embodiments of the present invention by decoupling the schedule of various subscribers by the systematic use of time reserves. This is accomplished by independently specifying the transmission time slot and application time periods for each individual subscriber in disjunct (i.e., non-overlapping) function-driven time intervals. Transmission time slots and application time periods may then be flexibly specified and modified within these function-driven time intervals without influencing one another.

An advantage of exemplary embodiments of the present invention is that as the result of this decoupling of transmission and application times, a control device remains unaffected by modifications to other control devices, provided that these modifications take place within the respective function-driven time intervals. The majority of functional modifications during the development process of a distributed bus system have an effect, i.e., only on a single device, by use of exemplary embodiments of the present invention. Likewise, by use of exemplary embodiments of the present invention a certified control device may be flexibly introduced into various bus systems without the need for reconfiguration. The number of required certification measures may be significantly reduced as a result of these two referenced factors. In many cases, this reduction significantly decreases both the time and the costs for developing time-driven bus systems.

In accordance with exemplary embodiments of the present invention the data communication occurs via a time-driven data bus within cyclically repeating bus cycle intervals. The length of these bus cycle intervals is referred to below as "bus cycle time." The bus cycle interval is divided into individual transmission time slots for the exact specification of time periods for message exchange within the bus cycle interval.

Various control devices used for controlling, regulating, or monitoring engine, safety, or comfort features are typically connected to such a time-driven data bus. The control devices exchange messages via the data bus in cyclical sequences and process these messages. The communication characteristics of a control device on a time-driven data bus often include the cyclical reception and transmission of more than one message. Frequently, for example, in a first step a message is received, in a second step the contents of the received message are processed, and in a third step the results of the processing are sent as a message. It is common for a single control device to also take part in multiple causal sequences of this type.

In the following discussion it is assumed from the outset that a control device includes one or more logical subscribers, in which a transmission process and processing of a task alternate and cyclically repeat. It is also assumed from the outset that the transmission process and the task processing take place in different time periods. Thus, the transmission time slots for a subscriber do not overlap with the subscriber's application time periods.

Thus, the processing of various tasks by a control device is distributed over the logical subscribers in such a way that each logical subscriber requires a contiguous time period for its task processing. A time period is likewise provided for the transmission process. By definition, any given number of messages may be transmitted in this time period. The practical implementation of this described subject matter and the extension of the principle of the invention to cases that do not conform to this definition are addressed further below.

A subscriber cycle time is specified for each subscriber according to the requirements for the frequency of the subscriber's communication or task processing. In principle, this subscriber cycle time may be a multiple or also a fraction of the bus cycle time. Idle times are frequently introduced into causal sequences due to the resolution of the close temporal interlinking of transmission time slots and application time periods associated with exemplary embodiments of the present invention. However, these idle times may be kept within functionally tolerable limits by appropriate choice of the subscriber cycle time.

Within a subscriber cycle interval having the length of the subscriber cycle time, according to exemplary embodiments of the present invention two disjunct function-driven time intervals are present, one of which, a transmission time interval, is provided exclusively for transmitting messages by the subscriber, and the other, an application time interval, is provided exclusively for task processing for the subscriber. It is assumed from the outset that the combined duration of both function-driven time intervals spans the entire subscriber cycle interval. For this case, in principle the definition of a single time interval is also sufficient, since the second time interval automatically results from the subscriber cycle interval minus the first time interval. To allow subsequent deviations from the limitation made here to be addressed in the same manner, however, the definition of two function-driven time intervals will be adhered to.

The following prerequisites should be taken into account for specifying the function-driven time intervals:

The length of the transmission time slots required by each subscriber for fulfilling the subscriber's required tasks is assumed to be known in a subscriber cycle interval. The length of the transmission time interval is selected to be at least large enough that transmission time slots of this length fit therein.

The length of the time period for task processing required by each subscriber for fulfilling the subscriber's required tasks is likewise assumed to be known in a subscriber cycle interval. The length of the application time interval is selected to be at least large enough that a time period of this length fits therein.

From the standpoint of a subscriber, the function-driven time intervals within the subscriber cycle interval should be specified so that the subscriber can fulfill its required task in the bus system when the location of the subscriber's transmission time slots within the transmission time interval and the location of the application time period within the application time interval are flexibly selected.

All subscriber cycle times and transmission time intervals should be specified such that in principle it is possible to plan all transmission time slots, both on the data bus and within the transmission time interval, for the respective subscriber without conflicts.

If the application time interval for a subscriber is greater than the length of the application time period, there is a time reserve for modifying the subscriber's application. If the transmission time interval for a subscriber is selected to be greater than the length of the transmission time slots, this results in greater flexibility in the global transmission time scheduling. If all of the above-referenced conditions are satisfied for various lengths of transmission time and application time intervals, a choice should be made as to which of the referenced advantages should be maximized, by selecting the application time interval or the transmission time interval to be as large as possible.

In a planning phase, first a system-wide (global) transmission time scheduler selects the transmission time slots for all subscribers such that the transmission time slots for a subscriber are within the respective transmission time interval and the transmission time slots for all subscribers are specified on the data bus without conflicts.

The result of the transmission time scheduling, i.e., the assignment of transmission time slots to the individual subscribers (slot assignment table), is communicated to the subscribers in a subsequent initializing phase. By definition, all subscribers can fulfill their required task when transmission time slots within the respective transmission time interval are assigned to the subscribers. This is ensured by the described scheduling process.

The application time periods are independent of the assigned transmission time slots as a result of the division into disjunct, function-driven time intervals. The application scheduling within the application time interval thus affects only the respective subscriber, and therefore can be performed by this subscriber itself (locally).

If a control device is designed in such a way that it does not have to be configured for the exact transmission time slots specified by the transmission time scheduler, but instead is available for transmission at any given time within a transmission time interval, modifications to the transmission time scheduling or a new sequence for the planning phase do not require modifications per se to the subscribers themselves. Only subscribers whose application has been modified in content need be altered and, if needed, recertified. This is also generally the case when the content of exchanged messages is modified for all involved subscribers, since a modification of the communication content also affects the application for the respective subscribers.

The time span between the end of task processing and the start of transmission time slots for a subscriber may vary due to the decoupled specification of transmission time slots and application time periods. This does not represent a technical problem if the data to be transmitted by the sending subscriber, for example at the end of task processing, are thus transferred to a transmitter unit no later than the end of the application time interval, and in turn no later than the start of the transmission time interval.

The advantages resulting from exemplary embodiments of the present invention for the development and flexible use of control devices for time-driven data buses are described below.

A first advantage of exemplary embodiments of the present invention is that temporal changes in the application or transmission behavior of a subscriber do not affect other subscribers, provided that the changes take place within the particular function-driven time intervals, and all requirements referenced in specifying the function-driven time intervals are also satisfied after the change. The reason for such changes may be that the task processing time previously provided for individual subscribers is no longer adequate for fulfilling the particular task, or that larger quantities of data must be transferred, thus requiring a greater number of transmission time slots than previously provided. After such a modification to a subscriber, it is necessary only to specify new transmission time slots in a new planning phase, and to communicate these to the subscribers in a new initializing phase. No changes to other subscribers and control devices are necessary.

A further advantage of exemplary embodiments of the present invention is that certified control devices may be used without modification in various bus systems, provided that all requirements referenced in specifying the function-driven time intervals are satisfied for each bus system. According to exemplary embodiments of the present invention, introduction of a control device into a bus system requires only that, likewise, transmission time slots be specified in a planning phase, and that these be communicated to the subscribers in an initializing phase. It is not necessary to make changes to any of the control devices.

In addition, according to exemplary embodiments of the present invention certified control devices may be used without modification in bus systems which also contain control devices with subscribers designed according to the prior art, in which transmission time slots and application time periods are strictly specified (backward compatibility). This case may be derived as a special case from the preceding instance, in which the transmission time interval for each subscriber comprises the exact transmission time slots actually required, and the application time interval for each subscriber comprises the exact application time period. By use of this definition, transmission time slots for all subscribers may be specified in a planning phase as described above, provided that all requirements referenced in specifying the function-driven time intervals are satisfied, and these transmission time slots are communicated to the subscribers according to exemplary embodiments of the present invention in an initializing phase. To this end, there must be no changes made to any of the control devices.

Since according to exemplary embodiments of the present invention the interface of a subscriber at the data bus is determined by the subscriber cycle time and the transmission time interval for the subscriber, the introduction of conventions for such an interface facilitates the compatibility of various subscribers with one another as well as the development of suitable scheduling processes. Several conventions are proposed below.

For systematically implementing exemplary embodiments of the present invention it may be advantageous to form classes of subscribers, each of which is characterized by a given subscriber cycle time and a given specification of the transmission time interval within the subscriber cycle interval.

It is advantageous to specify the classes in such a way that the bus bandwidth is well utilized, depending on the number of representatives in a subscriber class and their transmission time requirements. This may be achieved, for example, by selecting the subscriber cycle times for the subscriber classes as binary multiples of a base cycle time, and correspondingly providing the transmission time intervals within the subscriber cycle interval.

These and other specifications used to systematically implement exemplary embodiments of the present invention are accompanied or supported by synchronously starting the subscriber cycle interval for all subscribers represented on a data bus at at least one global synchronization time.

For systematically implementing exemplary embodiments of the present invention it may also be advantageous to specify a fixed ratio of the length of the transmission time interval to the application time interval, i.e., the subscriber cycle interval.

As the result of decoupling transmission times and application times, in principle any subscriber can itself perform the time planning within the particular application time interval (local application scheduling). In the simplest case, the task processing is started at the earliest possible time after the application time interval begins. Alternatively, it may be advantageous to plan the time of task processing for the subscriber so that the task processing ends at the latest possible time before the application time interval ends, i.e., so that a minimum time interval from the application time interval is observed. A minimum time interval between the transmission time interval and application time period could also be achieved by providing, in a manner which differs from a prerequisite established above, a time period between the transmission time interval and the application time interval for a subscriber.

Other objects, advantages and novel features of the present invention will become apparent from the following detailed description of the invention when considered in conjunction with the accompanying drawings.

BRIEF DESCRIPTION OF THE DRAWING FIGURES

The drawings show the following:

FIG. 7 shows a time sequence for the common use of subscribers designed according to the prior art, and subscribers designed according to exemplary embodiments of the present invention in a bus system;

FIG. 8 shows the function-driven time intervals for multiple subscriber classes specified for one exemplary embodiment of the present invention; and FIG. 9 shows various possibilities for taking into account a causal chain, which extends beyond a cyclic change between a transmission process and the processing of a task, by specifying the function-driven time intervals for multiple logical subscribers.

DETAILED DESCRIPTION OF THE DRAWINGS

Figure 1:
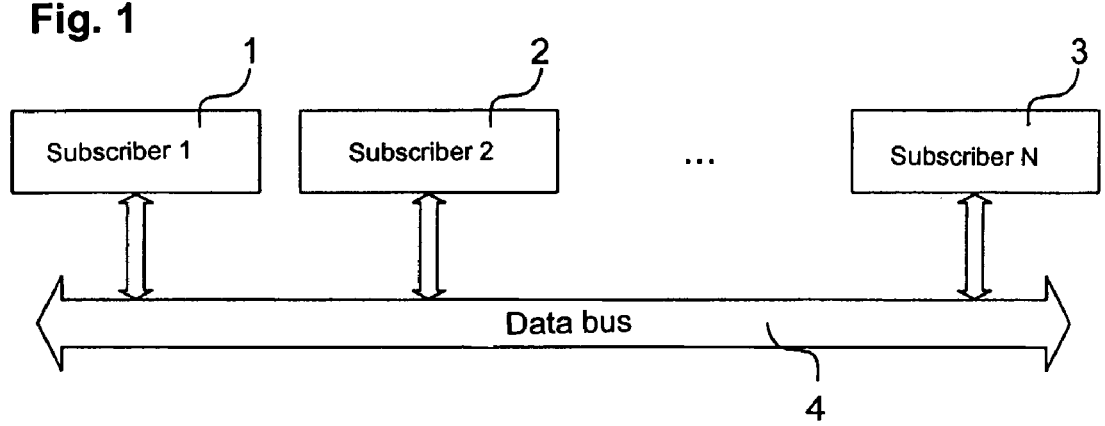
FIG. 1 shows a time-driven data bus for multiple subscribers.

FIG. 1 schematically shows a time-driven data bus 4 for multiple subscribers (number N). At the outset it is assumed that fixed transmission time slots and application time periods matched thereto are allocated according to the prior art in a global scheduling process for each subscriber.

Figure 2:
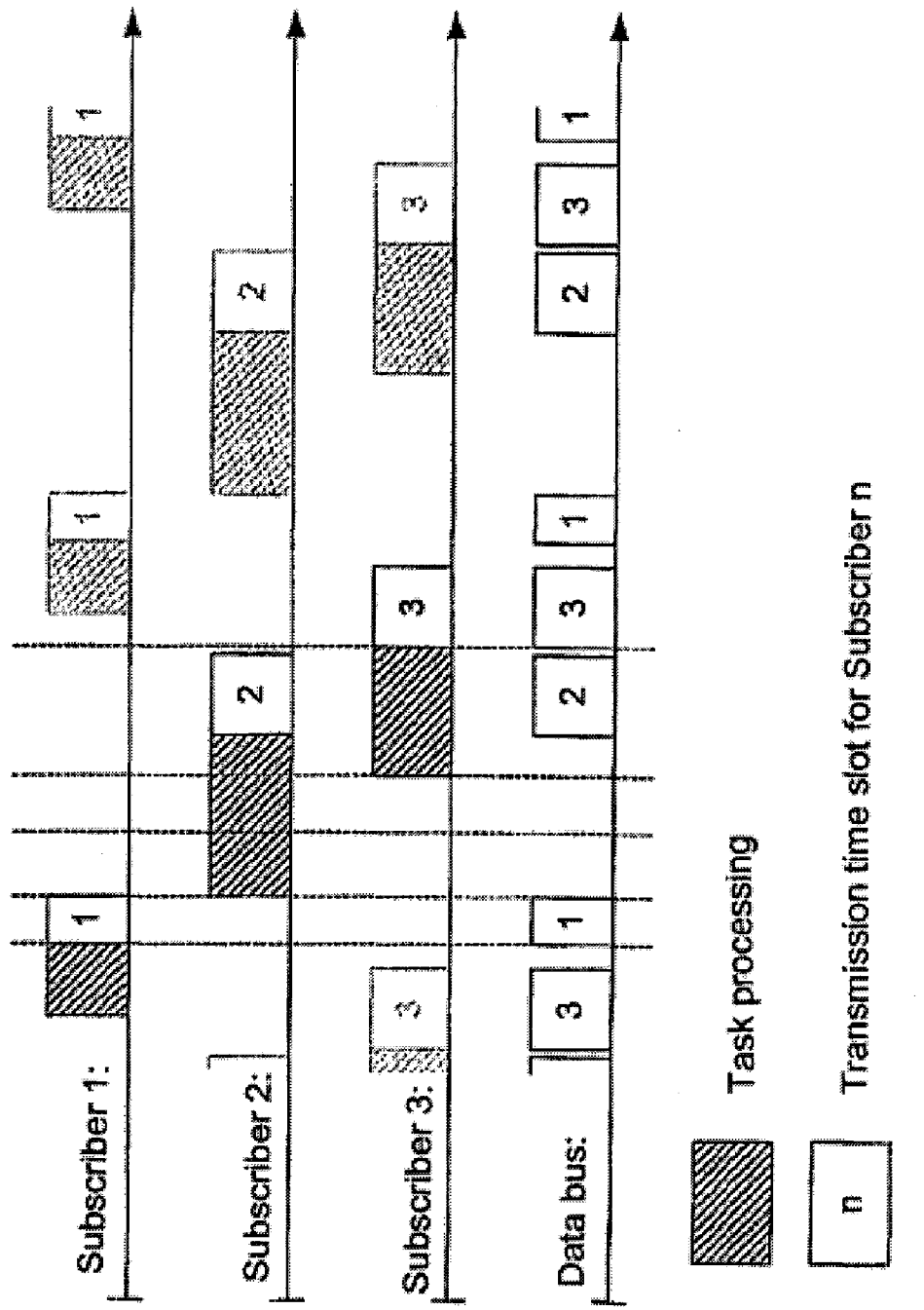
FIG. 2 shows the time sequence, specified by a scheduling process according to the prior art, of communication and task processing for three subscribers of a data bus according to FIG. 1.

FIG. 2 shows by way of example a time sequence of communication and task processing specified according to the prior art for three subscribers of a data bus 4 according to FIG. 1. It is assumed that subscriber 1 and subscriber 2 are causally linked to one another. According to the prior art, this relationship is reflected in close interlinking of transmission time slots and application time periods. If, for example, the task processing for subscriber 1 ends just before the transmission time slots for subscriber 1, the task processing for subscriber 2 starts immediately thereafter.

Figure 3:
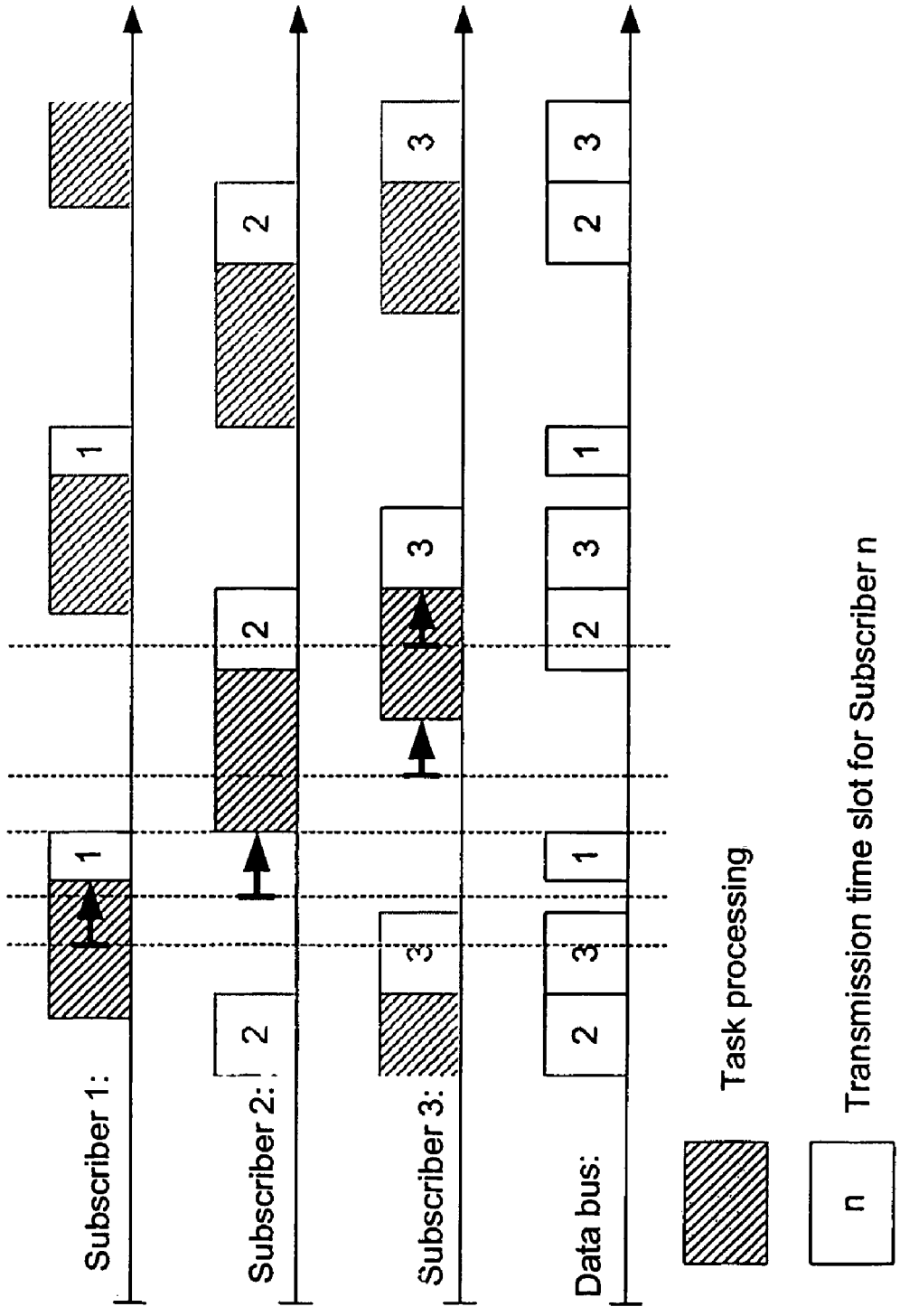
FIG. 3 shows the modified time sequence after an application modification to one of the subscribers.

FIG. 3 shows the altered time sequence after an application modification to one of the subscribers, in this case subscriber 1. As a result of extending the application time period for subscriber 1 with respect to FIG. 2, the subsequent message can no longer be transmitted in the previous transmission time slots. The transmission time slots for subscriber 1 must therefore be shifted. Subscriber 1 must be reconfigured and recertified because of the application modification.

Since the data transmitted by subscriber 1 are now available for subscriber 2 at a later time, the task processing for subscriber 2 also cannot be started at the previous time. The task processing for subscriber 2 must therefore be started at a later time than before. Due to the later end of task processing for subscriber 2 which results, the data to be sent by subscriber 2 are not available at the start of the previous transmission time slots. The transmission time slots for subscriber 2 must therefore be shifted. Because of the modified application time period, subscriber 2 must be reconfigured and recertified.

So as not to jeopardize further functional dependencies (not illustrated here), the transmission time slots for subscriber 2 are shifted backward only slightly. However, according to FIG. 2 the transmission time slots thus required by subscriber 2 have been partially used by subscriber 3. For this reason the transmission time slots for subscriber 3 must also be shifted. Since the task processing for subscriber 3 is temporally matched to the transmission time slots for subscriber 3, the time period for task processing for subscriber 3 is shifted as well. Because of the modified application time period, subscriber 3 must also be reconfigured and recertified.

Due to the close interlinking of transmission time slots and application time periods according to the prior art, an application modification in a single subscriber, in this case subscriber 1, thus affects the application time periods for multiple additional subscribers, in this case subscribers 2 and 3. In the example, as a result of the modifications a certification process is necessary not only for subscriber 1, but also for subscribers 2 and 3.

Extending the transmission time slot for subscriber 1, for example, would have a similar effect.

Figure 4:
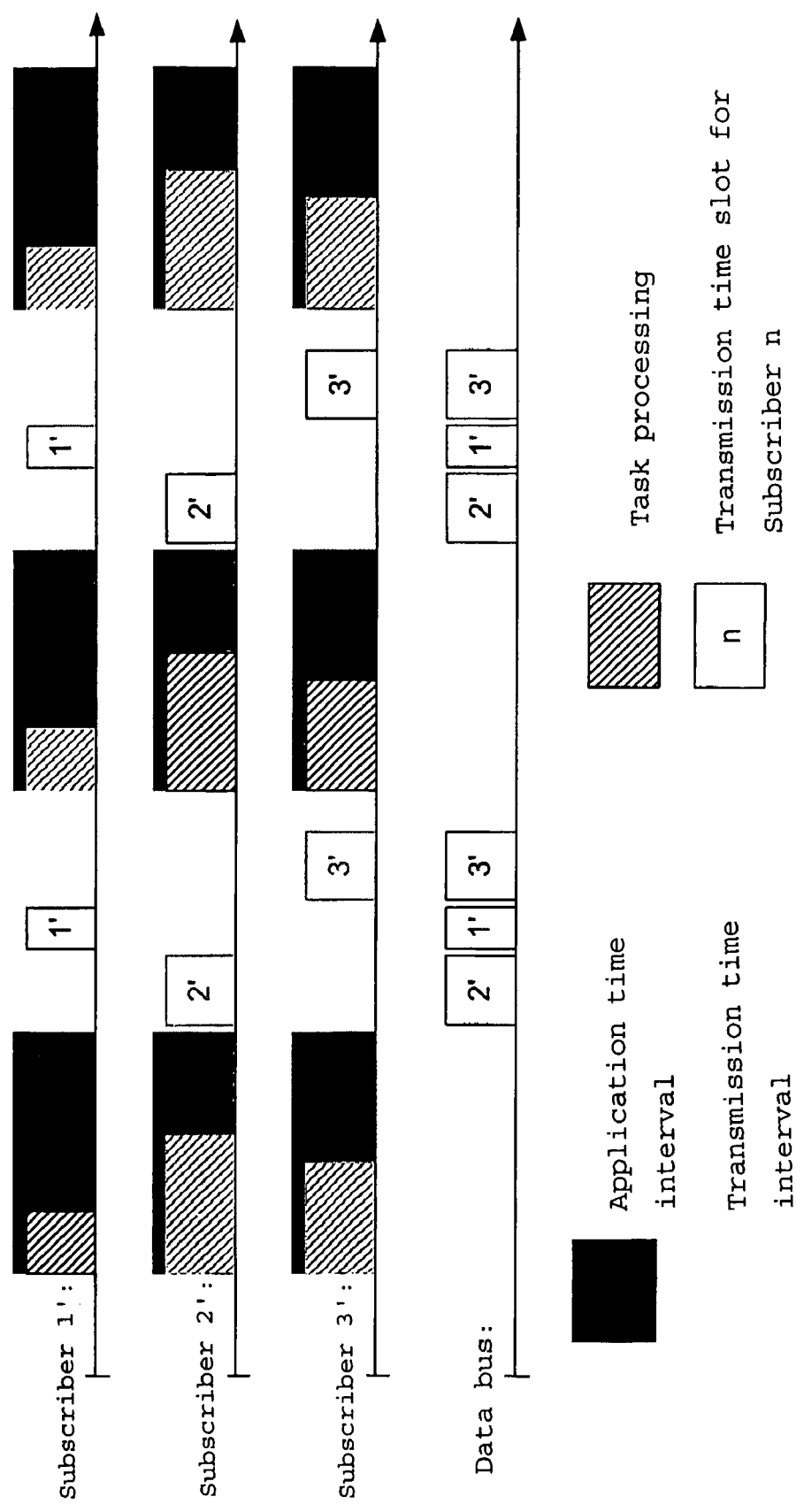
FIG. 4 shows the function-driven time intervals, transmission time slots, and application time periods specified according to exemplary embodiments of the present invention for three subscribers of a data bus according to FIG. 1.

FIG. 4 shows a bus diagram containing the transmission time intervals and application time intervals according to exemplary embodiments of the present invention as well as the transmission time slots and application time periods specified in scheduling according to exemplary embodiments of the present invention for three subscribers 1', 2', 3' in a time-driven data bus 4'. The function-driven time intervals are understood to be a part of the interface which every subscriber provides to the global transmission time scheduler, and the transmission time slots are understood to be an assignment of the global transmission time scheduler to the subscribers. Accordingly, the transmission time slots provided within the respective transmission time intervals as an example in FIG. 4 are specified by the global transmission time scheduler. The application time periods are specified within the application time interval provided for this purpose, independent of the transmission time slots specified by the subscriber itself.

Figure 5:
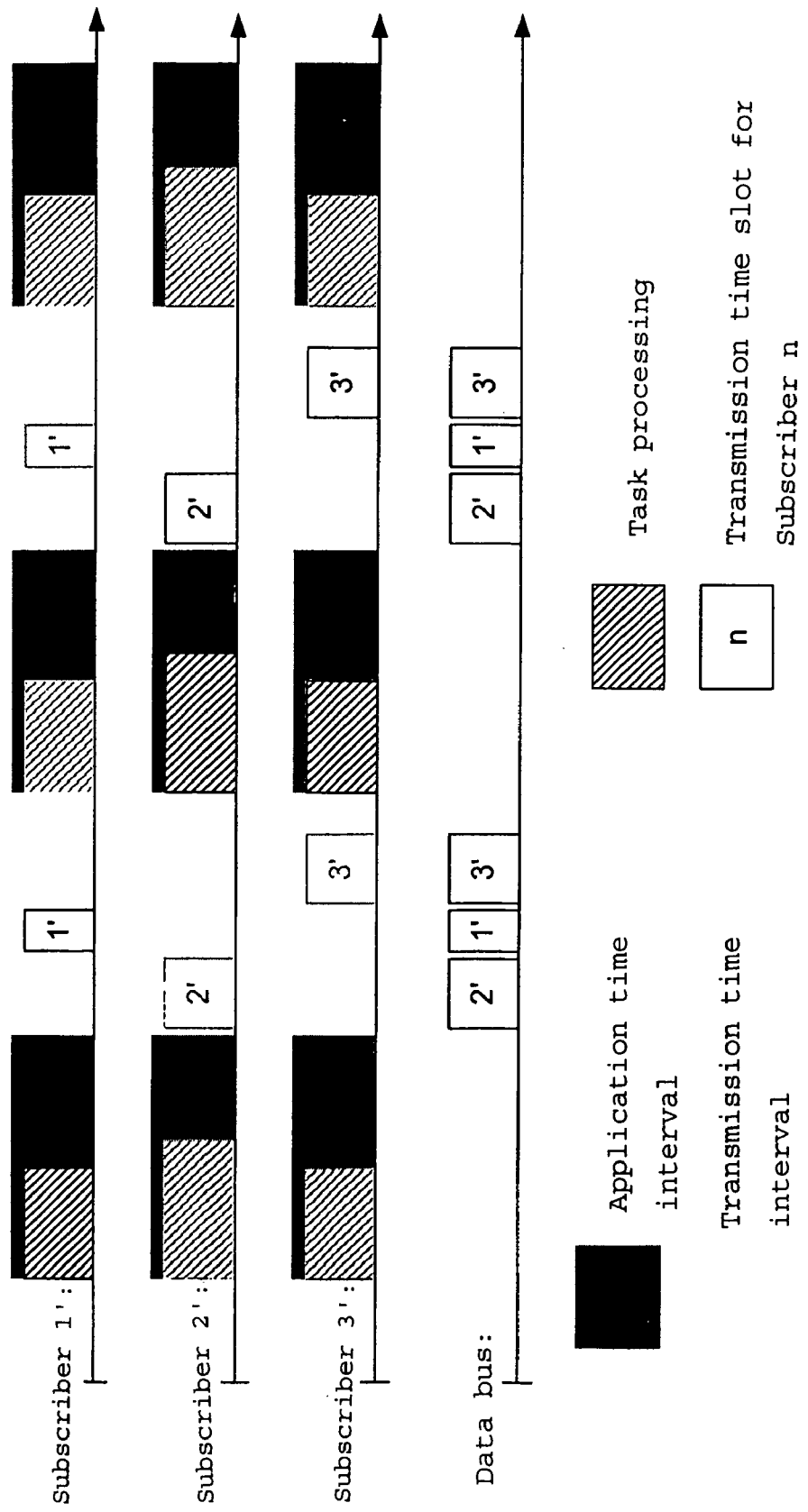
FIG. 5 shows the function-driven time intervals and the modified time sequence specified according to exemplary embodiments of the present invention after an application modification to one of the subscribers.
Figure 6:
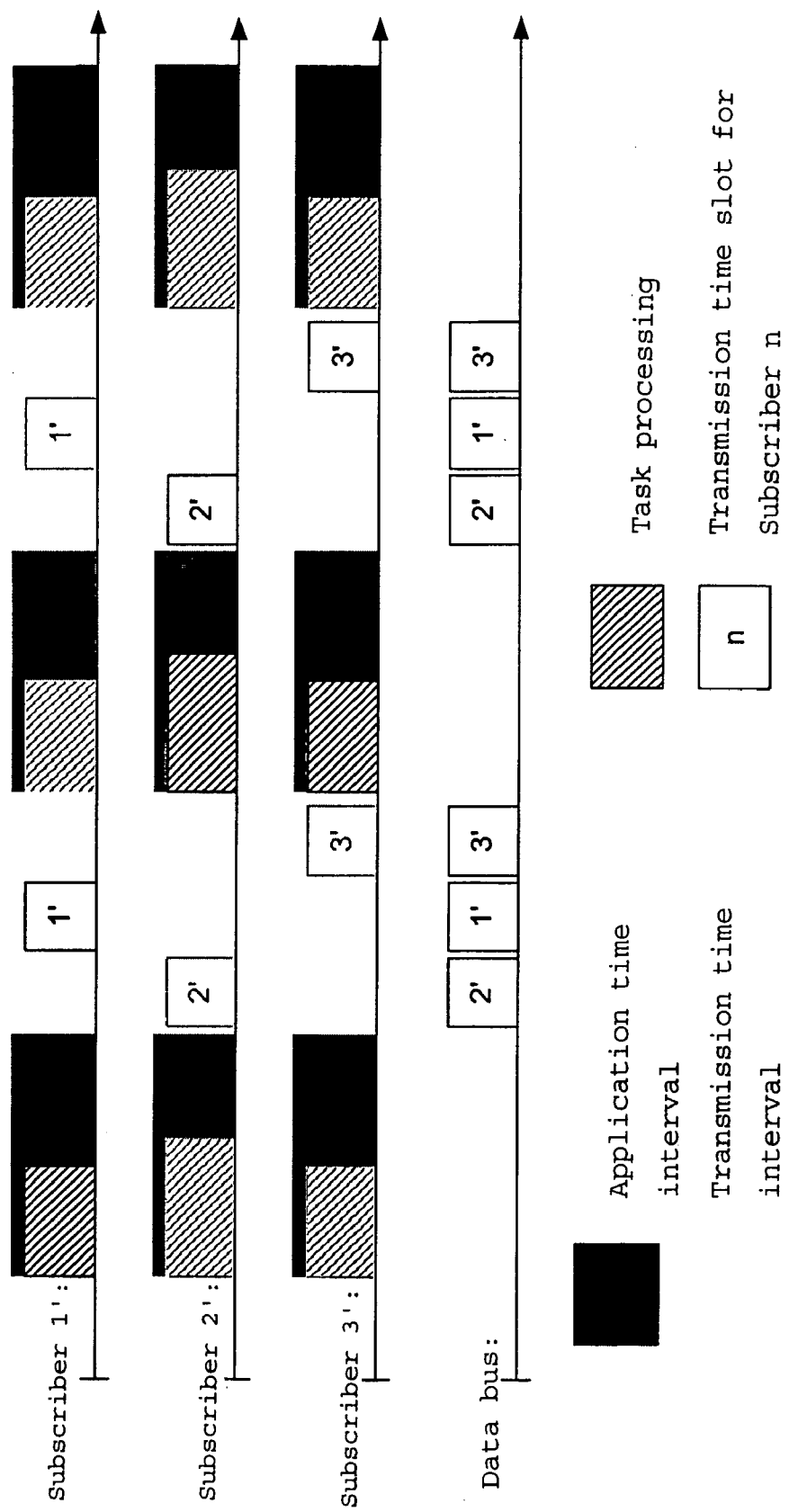
FIG. 6 shows the function-driven time intervals and the modified time sequence specified according to exemplary embodiments of the present invention after a modification of the communication between two subscribers.

This procedure offers various advantages, as illustrated in FIGS. 5, 6, and 7.

FIG. 5 shows a bus diagram in which the application for subscriber 1' has been modified with respect to FIG. 4. The time period required for the task processing has been extended accordingly. As a result of the time reserve provided in the specification of the function-driven time intervals, however, the modification can occur inside the application time interval. Only subscriber 1' must be reconfigured and recertified on account of the application modification. Since task processing and communication according to the invention take place in the decoupled state, no other subscribers in the data bus are affected by the modification of the application scheduling by subscriber 1'. Therefore, none of the other subscribers must be reconfigured and recertified.

In FIG. 6, in addition to the extended task processing time period which was already considered in FIG. 5, a change in content of the transmission data between subscriber 1' and subscriber 2', and consequently a greater length of the transmission time slots for the message sent by subscriber 1', is provided. As a result of the modified requirements, the global assignment of transmission time slots in the planning phase must be performed again by the global transmission time scheduler. The new transmission time slots are then communicated to the subscribers in an initializing phase. Since the transmission time slots are still in the provided transmission time intervals, even after the modification, no modifications are necessary for the application for any of the other subscribers. Since subscriber 2' utilizes the data from subscriber 1' which has changed in content, it may be necessary to modify the application for subscriber 2'. In contrast, the application for subscriber 3', which is independent of these data, remains unchanged. Thus, subscriber 3' does not have to be reconfigured and therefore the corresponding control device does not have to be recertified.

In addition to the examples discussed above, FIG. 4 and FIG. 6 may also be used to illustrate a further example of advantages of the invention. FIG. 4 may be understood to be a bus diagram for the introduction of subscriber 3' into a bus system A, which contains subscribers 1' and 2' having transmission and application times according to FIG. 4. If the same subscriber 3' is introduced without modification into a bus system B, which contains subscribers 1' and 2' having transmission and application times according to FIG. 6, an alternative time sequence, illustrated as an example in the bus diagram of FIG. 6, may be specified by the global transmission time scheduler. Subscriber 3' may thus be introduced into both networks A and B without modification, although different time sequences result in both introduction cases. None of the subscribers has to be reconfigured for this purpose, and therefore it is also not necessary to recertify any control device.

FIG. 7 shows one last example of the more flexible possibility for introducing subscribers in comparison to the prior art. Subscribers 1 and 2 may be considered to be designed according to the prior art. Communication therefore occurs in strictly specified transmission time slots, and the task processing occurs in strictly specified application time periods. In the method according to the invention, such subscribers are taken into account so that the transmission time interval is identical to the specified transmission time slots and the application time interval is identical to the specified application time period. The control device for subscriber 3', which has already been introduced into bus systems A and B according to FIGS. 4 and 6, is now introduced into a bus system C together with such subscribers. Provided that the message to be sent by subscriber 3' can be sent in the transmission time interval for subscriber 3', transmission time slots in this transmission time interval are assigned to subscriber 3' in the planning phase. Thus, subscriber 3' does not have to be modified for introduction into bus system C, and therefore the higher-level control device does not have to be recertified.

In comparison, a subscriber 3 in bus system C likewise designed according to the prior art can be used without modification with respect to introduction into another bus system only if communication of subscriber 3 takes place in this other bus system in transmission time slots which are also unoccupied in bus system C. This probability is significantly lower than the probability that, according to the invention, in a planning phase the required transmission time slots can be assigned within the transmission time interval for a subscriber. If more than one subscriber is introduced according to the inventive method into a bus system containing subscribers designed according to the prior art, the probability of being able to introduce without modification further increases for each individual subscriber according to the invention, with respect to the example in FIG. 7, as a result of the combined flexibility of multiple subscribers.

The examples previously discussed have been intentionally simplified for ease of understanding. Therefore, the same subscriber cycle time applies to all subscribers in the previously discussed examples. Depending on the requirements for the subscribers, however, the method according to the invention allows various subscriber cycle times. This is particularly advantageous, since idle times are frequently introduced into causal sequences due to the resolution of close interlinking of transmission time slots and application time periods. However, these idle times may be kept within functionally tolerable limits by appropriate choice of the subscriber cycle time.

The compatibility of certified control devices is facilitated when the represented subscriber cycle times are specified by discrete, not arbitrary, values. Depending on the values used, subscriber classes may then be defined. FIG. 8 shows the function-driven time intervals for multiple subscriber classes in accordance with one exemplary embodiment of the present invention in which the possible subscriber cycle times are specified as binary multiples of a base cycle time TC. For such a specification, the base cycle time TC is simultaneously the smallest subscriber cycle time T0 used. Thus, if fractions of the bus cycle time are also used in a bus system as subscriber cycle times, the base cycle time may also be less than the bus cycle time.

In one exemplary embodiment of the present invention (when applied in the context of the FlexRay™ protocol), one-half of the bus cycle time is used as the base cycle time. This lower limit is based on the fact that each bus cycle interval contains a dynamic segment in which event-driven communication requirements may be satisfied. In the specification of transmission time intervals, the dynamic segment is also occupied initially. However, if the transmission time intervals for the subscribers overlap only partially with the dynamic segment of the bus cycle interval, cyclical communication requirements may be planned by the global transmission time scheduler as far as possible outside the dynamic segment, if there are corresponding reserves in the bus capacity utilization. Thus, if the presence of individual transmission time intervals entirely in the dynamic segment of the bus cycle interval can be avoided, the dynamic segment continues to be available for the most part for event-driven communication requirements. When one-half the bus cycle time is used as the smallest subscriber cycle time, specification of function-driven time intervals is possible which guarantees this.

If various subscriber cycle times are used in a bus system, as a temporal reference range for the global transmission time scheduler a time interval should be used, within which all messages experience an integer number of repetitions. In the present case, this interval is referred to as the bus assignment interval. The length of the smallest possible bus assignment interval is the mathematically defined smallest common multiple of all subscriber cycle times used. If binary multiples of a base cycle time are used as subscriber cycle times, corresponding to a previously mentioned preferred embodiment, the smallest bus assignment interval which can be computationally determined has the length of the largest subscriber cycle interval used. As the result of system standards, the bus assignment interval may also be specified to be a given number of bus cycle intervals. An upper limit is set by this specification which is comparable to the specification of subscriber cycle times.

In the examples discussed thus far, for ease of understanding it has been implicitly assumed that the transmission time intervals have the same length as the application time intervals. However, the size ratio of the time intervals with respect to one another may be adapted as needed, provided that the conditions referenced at the outset for specifying function-driven time intervals are satisfied. Since the transmission time interval is part of the externally represented interface for a subscriber, in addition to the subscriber cycle time the transmission time interval must be taken into account in specifying subscriber classes.

In one exemplary embodiment of the present invention, the size ratio of the function-driven time intervals with respect to one another is specified as the statically determined ratio of the times required in the actual bus system for communication and task processing. Slight deviations from this ratio are caused by a quantization resulting from the subdivision of the subscriber cycle interval into transmission time slots.

Likewise for ease of understanding of exemplary embodiments of the present invention, it has been assumed that exactly one transmission time interval and one application time interval are contained in a subscriber cycle interval, that the combined duration of both time intervals spans the entire subscriber cycle interval, and that one of the time intervals synchronously starts at a global synchronization time. To allow complex causal dependencies to be taken into account, however, exemplary embodiments of the present invention may also involve more complex constructs of time intervals within a subscriber cycle interval which deviate from these rules. On the one hand, any given number of transmission time intervals and any given number of application time intervals may be provided in one subscriber cycle interval. On the other hand, the combined duration of the time intervals need not necessarily span the entire subscriber cycle interval. Likewise, all time intervals having any given temporal shift may start at one global synchronization time, and may extend over the boundary between multiple subscriber cycle intervals. However, the usability of subscribers in different bus systems is facilitated when only a limited number of various time interval constructs is used. A corresponding subscriber class may then be defined in each case for this number of variants.

Causal chains proceeding within a control device which extend beyond a cyclical exchange between a transmission process and the processing of a task may also be taken into account according to exemplary embodiments of the present invention by specifying time intervals, without the use of time interval constructs which contain more than one transmission time interval and one application time interval. On the one hand, such a causal chain may be allocated to multiple logical subscribers, each having one transmission time interval and one application time interval, whereby the cycle time of the causal chain is used as the subscriber cycle time, and the combined duration of the transmission time interval and the application time interval for a single logical subscriber does not span the entire subscriber cycle interval. On the other hand, such a causal chain may be allocated to multiple logical subscribers, each having one transmission time interval and one application time, whereby a fraction of the cycle time for the causal chain is used as the subscriber cycle time, and the combined duration of the transmission time interval and the application time interval for a single logical subscriber spans the entire subscriber cycle interval. If the last referenced exemplary embodiment of the present invention is chosen, there is a first implementation possibility in which, although the function-driven time intervals are fixed in the interface for the logical subscriber, they are used only in selected subscriber cycle intervals, controlled by additional information from the logical subscriber. A second implementation possibility is that consecutive causal chains may proceed not one after the other, but in a temporally overlapping fashion. In this case, however, it must be ensured in local application scheduling that the application time periods for various logical subscribers do not overlap.

Figure 9A:
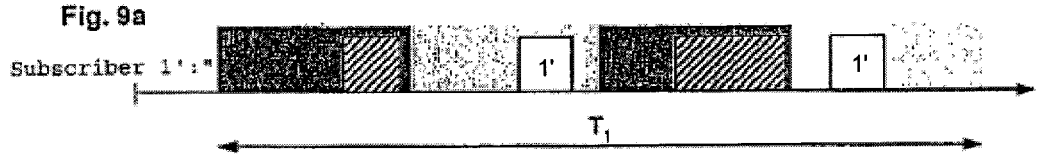
Figure 9B:
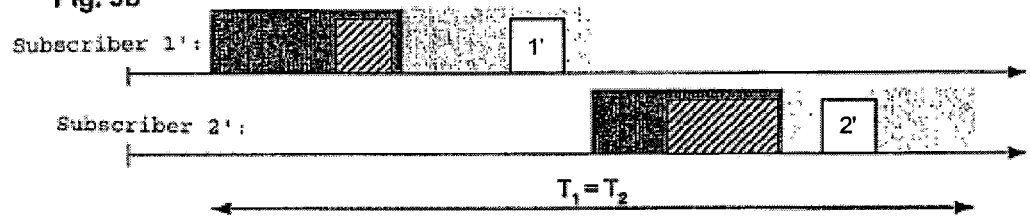
Figure 9C:
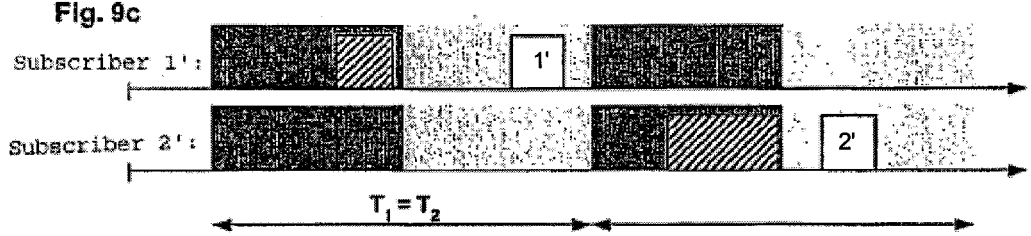
Figure 9D:
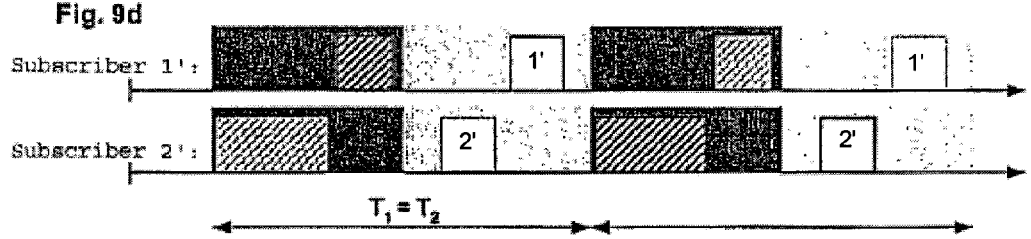

FIGS. 9a, 9b, 9c, and 9d show various possibilities for defining function-driven time intervals for implementing an exemplary causal chain within a control device. In FIG. 9a a time interval construct is selected having more than one transmission time interval and more than one application time interval. In FIG. 9b the causal chain is allocated to two logical subscribers, each having one transmission time interval and one application time interval, whereby the combined duration of the time intervals does not span the entire subscriber cycle interval. In FIG. 9c a shorter subscriber cycle time is selected for both logical subscribers, whereby all time intervals are not used in every subscriber cycle interval. In FIG. 9d all time intervals are used, as the result of which consecutive causal chains overlap.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for carrying out cyclic and conflict-free data communication for subscribers of a data bus, which transmits data in non-overlapping time periods within a subscriber cycle interval and processes tasks, and whose fixed transmission time slots in a planning phase are allocated within the subscriber cycle interval, the method comprising the acts of:

selecting, during the planning phase, the transmission time slots for each subscriber within the subscriber cycle interval, wherein the selected transmission time slots are within a transmission time interval that is disjunct with respect to an application time interval; and communicating, in an initialization phase subsequent to the planning phase, the selected transmission time slots to the subscribers, wherein the task processing for a subscriber is carried out exclusively within an application time interval within the subscriber cycle interval, and wherein the subscribers and data bus are components of a vehicle.

2. The method according to claim 1, wherein the transmission time interval for the subscriber is selected to be greater than the length of the transmission time slots.

3. The method according to claim 1, wherein the application time interval for the subscriber is selected to be greater than the duration of the task processing.

4. The method according to claim 1, wherein an individual subscriber cycle time is selected for each subscriber.

5. The method according to claim 4, wherein the subscriber is assigned to a subscriber class, depending on the subscriber cycle time and transmission time interval of the subscriber.

6. The method according to claim 5, wherein the subscriber cycle time for the subscriber class is selected as a binary multiple of a base cycle time.

7. The method according to claim 4, wherein the start of the subscriber cycle intervals for various subscribers is synchronously specified.

8. The method according to claim 4, wherein the length of the transmission time interval for the subscriber is selected in a given ratio with respect to the subscriber cycle time.

9. The method according to claim 4, wherein the transmission time interval for the subscriber is specified in a given location within the subscriber cycle interval.

10. The method according to claim 1, wherein the task processing for the subscriber is begun at the start of the application time interval.

11. The method according to claim 10, wherein the application time interval for the subscriber is specified directly after the transmission time interval.

12. The method according to claim 1, wherein the task processing for the subscriber is completed at the end of the application time interval.

13. The method according to claim 1, wherein the application time interval for the subscriber is specified directly before the transmission time interval.

14. The method according to claim 1, wherein the application time interval for the subscriber is specified with a minimum time interval from the transmission time interval.

15. The method according to claims 10, wherein the task processing for the subscriber is carried out with a minimum time interval from the start and the end of the application time interval.

16. A method for carrying out cyclic and conflict-free data communication for a plurality of subscribers of a data bus, the method comprising the acts of:

selecting, during a planning phase, transmission time slots for each of the plurality of subscribers within a subscriber cycle interval, wherein the subscriber cycle interval includes a transmission time interval for the transmission time slots and an application time interval for task processing by each of the plurality of subscribers and wherein the transmission time interval is disjunct from the application time interval; and communicating, in an initialization phase subsequent to the planning phase, the selected transmission time slots to the subscribers, wherein the task processing for each of the plurality of subscribers is carried out exclusively within the application time interval, and wherein the plurality of subscribers and data bus are components of a vehicle.

17. The method of claim 16, further comprising the acts of:
- processing the tasks, by each of the plurality of subscribers, during the application time interval; and
- transmitting, by each of the plurality of subscribers, in the transmission time slots during the transmission time interval.

18. The method of claim 17, wherein the application time interval is greater than a time for processing the tasks by each of the plurality of subscribers.

19. The method of claim 18, wherein the transmission time interval is greater than a sum of the transmission time slots.

* * * * *